United States Patent
Liu et al.

(10) Patent No.: US 10,237,849 B2
(45) Date of Patent: Mar. 19, 2019

(54) RESOURCE CONFIGURATION METHOD AND APPARATUS

(71) Applicant: Huawei Technologies Co., Ltd., Shenzhen (CN)

(72) Inventors: Deping Liu, Beijing (CN); Qiang Li, Doha (QA); Liang Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/220,097

(22) Filed: Jul. 26, 2016

(65) Prior Publication Data

US 2016/0338012 A1 Nov. 17, 2016

Related U.S. Application Data

(63) Continuation of application No. PCT/CN2014/071488, filed on Jan. 26, 2014.

(51) Int. Cl.
| | |
|---|---|
| *H04W 72/00* | (2009.01) |
| *H04W 4/06* | (2009.01) |
| *H04W 8/00* | (2009.01) |
| *H04W 76/27* | (2018.01) |
| *H04W 76/14* | (2018.01) |
| *H04W 52/02* | (2009.01) |

(52) U.S. Cl.
CPC ............ *H04W 72/005* (2013.01); *H04W 4/06* (2013.01); *H04W 8/005* (2013.01); *H04W 76/14* (2018.02); *H04W 76/27* (2018.02); *H04W 52/0229* (2013.01); *Y02D 70/00* (2018.01); *Y02D 70/21* (2018.01); *Y02D 70/22* (2018.01)

(58) Field of Classification Search
CPC ..... H04W 72/005; H04W 4/06; H04W 8/005; H04W 76/023; H04W 76/046; H04W 52/0229; Y02B 60/50
See application file for complete search history.

(56) References Cited

U.S. PATENT DOCUMENTS

| | | | | |
|---|---|---|---|---|
| 9,693,338 | B2 * | 6/2017 | Zhao | H04W 72/04 |
| 2003/0207692 | A1 * | 11/2003 | Goldberg | H04W 52/0229 |
| | | | | 455/466 |
| 2011/0258327 | A1 * | 10/2011 | Phan | H04W 76/14 |
| | | | | 709/227 |
| 2012/0307764 | A1 | 12/2012 | Zhao et al. | |

(Continued)

FOREIGN PATENT DOCUMENTS

| | | |
|---|---|---|
| CN | 103369585 A | 10/2013 |
| CN | 103517276 A | 1/2014 |

(Continued)

*Primary Examiner* — Lester G Kincaid
*Assistant Examiner* — William Y Wang
(74) *Attorney, Agent, or Firm* — Slater Matsil, LLP

(57) ABSTRACT

Embodiments of the present invention provide a resource configuration method and an apparatus. User equipment (UE) includes a receiving module and a processing module, where the receiving module is configured to receive a broadcast message sent by a control node and including at least one first resource pool, where the control node is a base station serving the UE or a group head UE of a group to which the UE belongs. The processing module is configured to receive a device to device (D2D) service or send a D2D service by using a resource in the at least one first resource pool.

20 Claims, 2 Drawing Sheets

(56) References Cited

U.S. PATENT DOCUMENTS

| | | | |
|---|---|---|---|
| 2013/0109301 A1 | 5/2013 | Hakola et al. | |
| 2014/0095601 A1* | 4/2014 | Abuelsaad | G06F 9/5072 709/204 |
| 2014/0328329 A1* | 11/2014 | Novlan | H04W 72/042 370/336 |
| 2015/0004901 A1* | 1/2015 | Agiwal | H04W 76/14 455/39 |
| 2015/0156806 A1* | 6/2015 | Pan | H04W 72/121 455/39 |

FOREIGN PATENT DOCUMENTS

| | | | |
|---|---|---|---|
| CN | 103517371 A | 1/2014 | |
| WO | 2011006815 A2 | 1/2011 | |
| WO | 2011116815 A1 | 9/2011 | |
| WO | WO-2015065881 A1 * | 5/2015 | ............ H04W 76/18 |

* cited by examiner

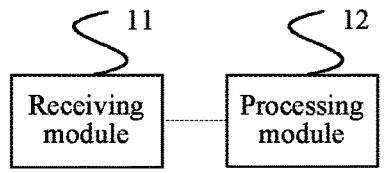
FIG. 1
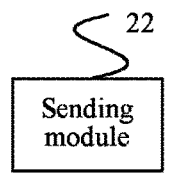
FIG. 2
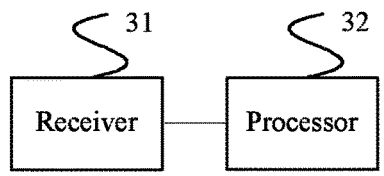
FIG. 3
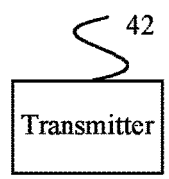
FIG. 4
A UE receives a broadcast message sent by a control node and including at least one first resource pool, where the control node is a base station serving the UE or a group head UE of a group to which the UE belongs  S101
The UE receives a D2D service or sends a D2D service by using a resource in the at least one first resource pool  S102
FIG. 5

RESOURCE CONFIGURATION METHOD AND APPARATUS

CROSS-REFERENCE TO RELATED APPLICATIONS

This application is a continuation of International Application No. PCT/CN2014/071488, filed on Jan. 26, 2014, which is hereby incorporated by reference in its entirety.

TECHNICAL FIELD

Embodiments of the present invention relate to the field of communications technologies, and in particular, to a resource configuration method and an apparatus.

BACKGROUND

A proximity service (ProSe) refers to a service manner in which user equipments (UE) that are near each other transfer information to each other. The ProSe generally includes two processes: ProSe discovery and ProSe communication. The ProSe discovery refers to a process in which an adjacent UE is identified, and the ProSe communication refers to a process in which UEs that are near each other perform communication. The ProSe communication may be specifically classified into unicast communication, multicast communication, and the like. A ProSe may be described as a peer to peer (P2P) service, a device to device (D2D) service, or the like. In a ProSe system, there is a shorter distance and a shorter signal propagation path between a UE sending a ProSe signal (which includes a ProSe discovery signal and a ProSe communication signal) and a UE receiving the ProSe signal, and less signal fading occurs; therefore, communication between the UEs can be directly performed, that is, service data or a signal does not need to be forwarded by a base station. In this case, transmit power of a ProSe signal sent by the UE is generally less, which can therefore achieve an objective of saving power and reducing interference.

In the ProSe system, the UE sending a ProSe signal needs to determine a resource used to send a D2D service, and the UE receiving a ProSe signal needs to determine a resource used to receive a D2D service. In the prior art, a resource used to send a D2D service/receive a D2D service is selected from a pre-configured resource pool, and a UE can acquire the pre-configured resource pool only when the UE is in a connection state. Some UEs may have no requirement to communicate with a base station, and these UEs may enter an idle state. However, a UE in an idle state still has a requirement of receiving or sending a D2D service. How to configure a resource pool for a UE in an idle state is a problem to be resolved.

SUMMARY

Embodiments provide a resource configuration method and an apparatus, which can resolve a problem of configuration of a resource pool for a user equipment (UE) in an idle state, so that the UE in the idle state can acquire a sending resource pool or a receiving resource pool without connecting to a control node, thereby reducing power consumption of the UE.

According to a first aspect, an embodiment provides a user equipment including a receiving module, configured to receive a broadcast message sent by a control node and including at least one first resource pool, where the control node is a base station serving the UE or a group head UE of a group to which the UE belongs. The user equipment also includes a processing module, configured to receive a device to device (D2D) service or send a D2D service by using a resource in the at least one first resource pool.

In a first possible implementation manner of the first aspect, the first resource pool includes a sending resource pool and/or a receiving resource pool, and the receiving, by a processing module, a D2D service or sending a D2D service by using a resource in the at least one first resource pool includes: sending, by the processing module, the D2D service by using the sending resource pool included in the at least one first resource pool, and receiving the D2D service by using the receiving resource pool included in the at least one first resource pool.

With reference to the first aspect or the first possible implementation manner of the first aspect, in a second possible implementation manner of the first aspect, the receiving module is further configured to: receive a dedicated message sent by the control node and including at least one second sub-resource pool; and the processing module is further configured to receive a D2D service or send a D2D service by using a resource in the at least one first resource pool or the at least one second sub-resource pool.

With reference to the second possible implementation manner of the first aspect, in a third possible implementation manner of the first aspect, the second resource pool includes a sending resource pool and/or a receiving resource pool, and the receiving, by the processing module, a D2D service or sending a D2D service by using a resource in the at least one first resource pool or the at least one second sub-resource pool includes: sending, by the processing module, the D2D service by using the sending resource pool included in the at least one first resource pool or the at least one second sub-resource pool, and receiving the D2D service by using the receiving resource pool included in the at least one first resource pool or the at least one second sub-resource pool.

With reference to the user equipment in any one of the first aspect to the third possible implementation manner of the first aspect, in a fourth possible implementation manner of the first aspect, the sending resource pool includes a sending resource pool of at least one cell or at least one proximity service group, and the receiving resource pool includes a receiving resource pool of at least one cell or at least one proximity service group.

With reference to the fourth possible implementation manner of the first aspect, in a fifth possible implementation manner of the first aspect, control nodes of different cells or different proximity service groups need to exchange sending resource pools and/or receiving resource pools with each other.

With reference to the user equipment in any one of the first aspect to the fifth possible implementation manner of the first aspect, in a sixth possible implementation manner of the first aspect, a receiving resource pool and a sending resource pool of a same cell or a same proximity service group have an intersection set.

According to a second aspect, an embodiment provides a control node, including a sending module, configured to send a broadcast message including at least one first resource pool, so that UE that receives the broadcast message receives a D2D service or sends a D2D service by using a resource in the at least one first resource pool, where the control node is a base station serving the UE or a group head UE of a group to which the UE belongs.

In a first possible implementation manner of the second aspect, the first resource pool includes a sending resource pool and/or a receiving resource pool, so that the UE sends the D2D service by using the sending resource pool included in the at least one first resource pool and receives the D2D service by using the receiving resource pool included in the at least one first resource pool.

With reference to the second aspect or the first possible implementation manner of the second aspect, in a second possible implementation manner of the second aspect, the sending module is further configured to: send a dedicated message including at least one second sub-resource pool to the UE, so that the UE receives a D2D service or sends a D2D service by using a resource in the at least one first resource pool or the at least one second sub-resource pool.

With reference to the second possible implementation manner of the second aspect, in a third possible implementation manner of the second aspect, the second resource pool includes a sending resource pool and/or a receiving resource pool, so that the UE sends the D2D service by using the sending resource pool included in the at least one first resource pool or the at least one second sub-resource pool and receives the D2D service by using the receiving resource pool included in the at least one first resource pool or the at least one second sub-resource pool.

With reference to the control node in any one of the second aspect to the third possible implementation manner of the second aspect, in a fourth possible implementation manner of the second aspect, the sending resource pool includes a sending resource pool of at least one cell or at least one proximity service group, and the receiving resource pool includes a receiving resource pool of at least one cell or at least one proximity service group.

With reference to the fourth possible implementation manner of the second aspect, in a fifth possible implementation manner of the second aspect, control nodes of different cells or different proximity service groups need to exchange sending resource pools and/or receiving resource pools with each other.

With reference to the control node in any one of the second aspect to the fifth possible implementation manner of the second aspect, in a sixth possible implementation manner of the second aspect, a receiving resource pool and a sending resource pool of a same cell or a same proximity service group have an intersection set.

According to a third aspect, an embodiment provides a resource configuration method, including: receiving, by UE, a broadcast message sent by a control node and including at least one first resource pool, where the control node is a base station serving the UE or a group head UE of a group to which the UE belongs; and receiving, by the UE, a D2D service or sending a D2D service by using a resource in the at least one first resource pool.

In a first possible implementation manner of the third aspect, the first resource pool includes a sending resource pool and/or a receiving resource pool, and the receiving, by the UE, a D2D service or sending a D2D service by using a resource in the at least one first resource pool includes: sending, by the UE, the D2D service by using the sending resource pool included in the at least one first resource pool, and receiving, by the UE, the D2D service by using the receiving resource pool included in the at least one first resource pool.

With reference to the third aspect or the first possible implementation manner of the third aspect, in a second possible implementation manner of the third aspect, the method further includes: receiving, by the UE, a dedicated message sent by the control node and including at least one second sub-resource pool; and receiving, by the UE, a D2D service or sending a D2D service by using a resource in the at least one first resource pool or the at least one second sub-resource pool.

With reference to the second possible implementation manner of the third aspect, in a third possible implementation manner of the third aspect, the second resource pool includes a sending resource pool and/or a receiving resource pool, and the receiving, by the UE, a D2D service or sending a D2D service by using a resource in the at least one first resource pool or the at least one second sub-resource pool includes: sending, by the UE, the D2D service by using the sending resource pool included in the at least one first resource pool or the at least one second sub-resource pool, and receiving, by the UE, the D2D service by using the receiving resource pool included in the at least one first resource pool or the at least one second sub-resource pool.

With reference to the method in any one of the third aspect to the third possible implementation manner of the third aspect, in a fourth possible implementation manner of the third aspect, the sending resource pool includes a sending resource pool of at least one cell or at least one proximity service group, and the receiving resource pool includes a receiving resource pool of at least one cell or at least one proximity service group.

With reference to the fourth possible implementation manner of the third aspect, in a fifth possible implementation manner of the third aspect, control nodes of different cells or different proximity service groups need to exchange sending resource pools and/or receiving resource pools with each other.

With reference to the method in any one of the third aspect to the fifth possible implementation manner of the third aspect, in a sixth possible implementation manner of the third aspect, a receiving resource pool and a sending resource pool of a same cell or a same proximity service group have an intersection set.

According to a fourth aspect, an embodiment provides a resource configuration method, including: sending, by a control node, a broadcast message including at least one first resource pool, so that UE that receives the broadcast message receives a D2D service or sends a D2D service by using a resource in the at least one first resource pool, where the control node is a base station serving the UE or a group head UE of a group to which the UE belongs.

In a first possible implementation manner of the fourth aspect, the first resource pool includes a sending resource pool and/or a receiving resource pool, so that the UE sends the D2D service by using the sending resource pool included in the at least one first resource pool and receives the D2D service by using the receiving resource pool included in the at least one first resource pool.

With reference to the fourth aspect or the first possible implementation manner of the fourth aspect, in a second possible implementation manner of the fourth aspect, the method further includes: sending, by the control node, a dedicated message including at least one second sub-resource pool to the UE, so that the UE receives a D2D service or sends a D2D service by using a resource in the at least one first resource pool or the at least one second sub-resource pool.

With reference to the second possible implementation manner of the fourth aspect, in a third possible implementation manner of the fourth aspect, the second resource pool includes a sending resource pool and/or a receiving resource pool, so that the UE sends the D2D service by using the sending resource pool included in the at least one first resource pool or the at least one second sub-resource pool and receives the D2D service by using the receiving resource pool included in the at least one first resource pool or the at least one second sub-resource pool.

With reference to the method in any one of the fourth aspect to the third possible implementation manner of the fourth aspect, in a fourth possible implementation manner of the fourth aspect, the sending resource pool includes a sending resource pool of at least one cell or at least one proximity service group, and the receiving resource pool includes a receiving resource pool of at least one cell or at least one proximity service group.

With reference to the fourth possible implementation manner of the fourth aspect, in a fifth possible implementation manner of the fourth aspect, control nodes of different cells or different proximity service groups need to exchange sending resource pools and/or receiving resource pools with each other.

With reference to the method in any one of the fourth aspect to the fifth possible implementation manner of the fourth aspect, in a sixth possible implementation manner of the fourth aspect, a receiving resource pool and a sending resource pool of a same cell or a same proximity service group have an intersection set.

According to the resource configuration method and the apparatus provided in the embodiments, a resource pool is configured for a UE by using a broadcast message of a control node, and the UE receives a D2D service or sends a D2D service by using a resource in the resource pool, which can resolve a problem of configuration of a resource pool for a UE in an idle state. In this way, the UE in the idle state can acquire a sending resource pool or a receiving resource pool without connecting to the control node, which not only can reduce power consumption of the UE but also can reduce load on a to-be-connected base station.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show some embodiments, and persons of ordinary skill in the art may still derive other drawings from these accompanying drawings without creative efforts.

FIG. 1 is a schematic structural diagram of embodiment 1 of user equipment;

FIG. 2 is a schematic structural diagram of embodiment 1 of a control node;

FIG. 3 is a schematic structural diagram of embodiment 2 of user equipment;

FIG. 4 is a schematic structural diagram of embodiment 2 of a control node;

FIG. 5 is a flowchart of embodiment 1 of a resource configuration method;

DETAILED DESCRIPTION OF ILLUSTRATIVE EMBODIMENTS

Figures 6, 7:
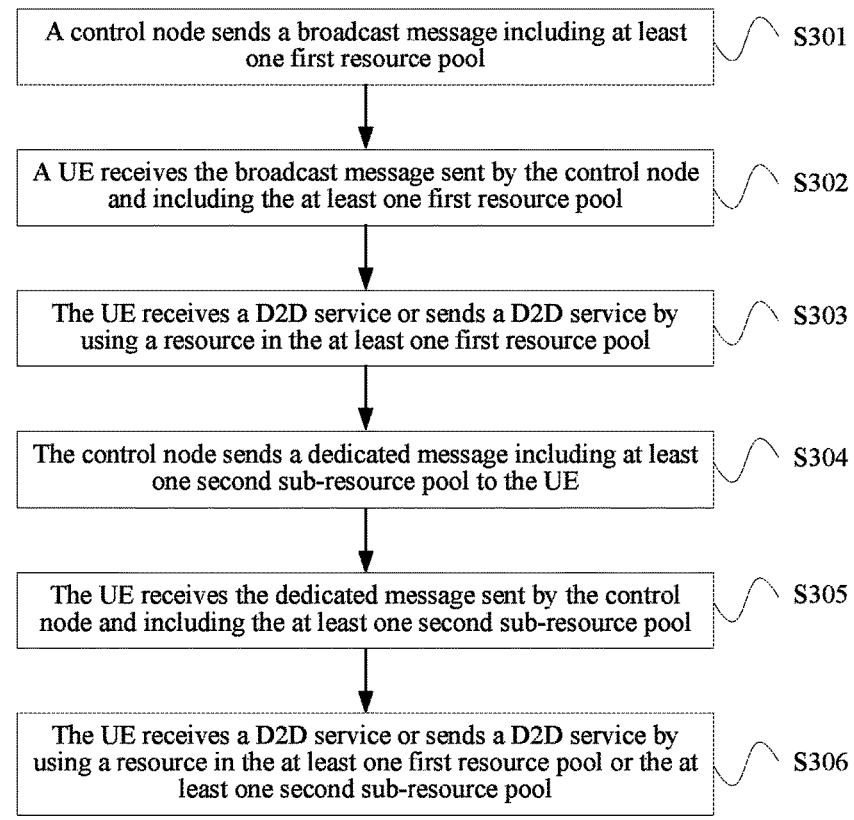
FIG. 6 is a flowchart of embodiment 2 of a resource configuration method.
FIG. 7 is a flowchart of embodiment 3 of a resource configuration method.

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope.

FIG. 1 is a schematic structural diagram of Embodiment 1 of user equipment according to embodiments. As shown in FIG. 1, the user equipment in this embodiment may include a receiving module 11 and a processing module 12. The receiving module 11 is configured to receive a broadcast message sent by a control node and including at least one first resource pool, where the control node is a base station serving the user equipment (UE) or a group head UE of a group to which the UE belongs. The processing module 12 is configured to receive a device to device (D2D) service or send a D2D service by using a resource in the at least one first resource pool.

Specifically, the control node configures, by using a broadcast message, at least one first resource pool for a UE served by the control node or a potential UE that is not yet connected to a system, where the first resource pool includes a sending resource pool and/or a receiving resource pool. The receiving, by the processing module 12, a D2D service or sending a D2D service by using a resource in the at least one first resource pool is specifically: sending, by the processing module 12, the D2D service by using the sending resource pool included in the at least one first resource pool, and receiving the D2D service by using the receiving resource pool included in the at least one first resource pool.

According to the user equipment provided in this embodiment, a resource pool is configured for the UE by using a broadcast message of a control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to the control node, which not only can reduce power consumption of the UE but also can reduce load on a to-be-connected base station.

Further, sending of a D2D service by the UE generally needs to be controlled by the control node, and therefore, the UE sending the D2D service needs to be connected to the control node. The UE connected to the control node may receive a UE-specific message, for example, radio resource control (RRC) signaling, physical downlink control channel (PDCCH) signaling, and enhanced physical downlink control channel (ePDCCH) signaling. After the UE in the idle state (for example, RRC-idle) is connected to the control node and enter a connected state (for example, RRC-connected), the control node may further configure at least one resource pool for the UE by using a UE-specific message. In this case, the receiving module 11 is further configured to: receive a dedicated message sent by the control node and including at least one second sub-resource pool.

The processing module 12 is further configured to receive a D2D service or send a D2D service by using a resource in the at least one first resource pool or the at least one second sub-resource pool.

The second resource pool includes a sending resource pool and/or a receiving resource pool, and the receiving, by the processing module 12, a D2D service or sending a D2D service by using a resource in the at least one first resource pool or the at least one second sub-resource pool is specifically: sending, by the processing module 12, the D2D service by using the sending resource pool included in the at least one first resource pool or the at least one second sub-resource pool, and receiving the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following.

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist.

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in the different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

FIG. 2 is a schematic structural diagram of Embodiment 1 of a control node according to embodiments. The control node may be a base station serving a UE or a group head UE of a group to which a UE belongs. As shown in FIG. 2, the control node in this embodiment may include a sending module 22. The sending module 22 is configured to send a broadcast message including at least one first resource pool, so that a UE that receives the broadcast message receives a D2D service or sends a D2D service by using a resource in the at least one first resource pool, where the control node is a base station serving the UE or a group head UE of a group to which the UE belongs.

The first resource pool includes a sending resource pool and/or a receiving resource pool, so that the UE sends the D2D service by using the sending resource pool included in the at least one first resource pool and receives the D2D service by using the receiving resource pool included in the at least one first resource pool.

According to the control node provided in this embodiment, a resource pool is configured for a UE by using a broadcast message of the control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to a control node, which not only can reduce power consumption of the UE but also can reduce load on a to-be-connected base station.

Further, the sending module 22 is further configured to: send a dedicated message including at least one second sub-resource pool to the UE, where the dedicated message is, for example, RRC signaling, PDCCH signaling, and ePDCCH signaling, so that the UE receives a D2D service or sends a D2D service by using a resource in the at least one first resource pool or the at least one second sub-resource pool.

The second resource pool includes a sending resource pool and/or a receiving resource pool, so that the UE sends the D2D service by using the sending resource pool included in the at least one first resource pool or the at least one second sub-resource pool and receives the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following.

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist.

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in the different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

FIG. 3 is a schematic structural diagram of Embodiment 2 of user equipment according to embodiments. As shown in FIG. 3, the user equipment in this embodiment may include a receiver 31 and a processor 32. The receiver 31 is configured to receive a broadcast message sent by a control node and including at least one first resource pool, where the control node is a base station serving the UE or a group head UE of a group to which the UE belongs. The processor 32 is configured to receive a D2D service or send a D2D service by using a resource in the at least one first resource pool.

Specifically, the control node configures, by using a broadcast message, at least one first resource pool for a UE served by the control node or a potential UE that is not yet connected to a system, where the first resource pool includes a sending resource pool and/or a receiving resource pool. The receiving, by the processor 32, a D2D service or sending a D2D service by using a resource in the at least one first resource pool is specifically: sending, by the processor 32, the D2D service by using the sending resource pool included in the at least one first resource pool, and receiving the D2D service by using the receiving resource pool included in the at least one first resource pool.

According to the user equipment provided in this embodiment, a resource pool is configured for the UE by using a broadcast message of a control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to the control node, which not only can reduce power consumption of the UE but also can reduce load on a to-be-connected base station.

Further, sending of a D2D service by the UE generally needs to be controlled by the control node, and therefore, the UE sending the D2D service needs to be connected to the control node. The UE connected to the control node may receive a UE-specific message, for example, RRC signaling, PDCCH signaling, and ePDCCH signaling. After the UE in the idle state (for example, RRC-idle) is connected to the control node and enter a connected state (for example, RRC-connected), the control node may further configure at least one resource pool for the UE by using a UE-specific message. In this case, the receiver 31 is further configured to: receive a dedicated message sent by the control node and including at least one second sub-resource pool.

The processor 32 is further configured to receive a D2D service or send a D2D service by using a resource in the at least one first resource pool or the at least one second sub-resource pool.

The second resource pool includes a sending resource pool and/or a receiving resource pool, and the receiving, by the processor 32, a D2D service or sending a D2D service by using a resource in the at least one first resource pool or the at least one second sub-resource pool is specifically: sending, by the processor 32, the D2D service by using the sending resource pool included in the at least one first resource pool or the at least one second sub-resource pool, and receiving the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following.

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist.

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in the different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

FIG. 4 is a schematic structural diagram of Embodiment 2 of a control node according to embodiments. The control node may be a base station serving a UE or a group head UE of a group to which a UE belongs. As shown in FIG. 4, the control node in this embodiment may include a transmitter 42. The transmitter 42 is configured to send a broadcast message including at least one first resource pool, so that a UE that receives the broadcast message receives a D2D service or sends a D2D service by using a resource in the at least one first resource pool, where the control node is a base station serving the UE or a group head UE of a group to which the UE belongs.

The first resource pool includes a sending resource pool and/or a receiving resource pool, so that the UE sends the D2D service by using the sending resource pool included in the at least one first resource pool and receives the D2D service by using the receiving resource pool included in the at least one first resource pool.

According to the control node provided in this embodiment, a resource pool is configured for a UE by using a broadcast message of the control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to the control node, which not only can reduce power consumption of the UE but also can reduce load on a to-be-connected base station.

Further, the transmitter 42 is further configured to: send a dedicated message including at least one second sub-resource pool to the UE, where the dedicated message is, for example, RRC signaling, PDCCH signaling, and ePDCCH signaling, so that the UE receives a D2D service or sends a D2D service by using a resource in the at least one first resource pool or the at least one second sub-resource pool.

The second resource pool includes a sending resource pool and/or a receiving resource pool, so that the UE sends the D2D service by using the sending resource pool included in the at least one first resource pool or the at least one second sub-resource pool and receives the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following.

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist.

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in the different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

FIG. 5 is a flowchart of Embodiment 1 of a resource configuration method according to embodiments. An example in which this embodiment is executed by a UE is used for description. As shown in FIG. 5, the method in this embodiment may include the following.

S101: A UE receives a broadcast message sent by a control node and including at least one first resource pool, where the control node is a base station serving the UE or a group head UE of a group to which the UE belongs.

S102: The UE receives a D2D service or sends a D2D service by using a resource in the at least one first resource pool.

Specifically, the control node configures, by using a broadcast message, at least one first resource pool for a UE served by the control node or a potential UE that is not yet connected to a system, where the first resource pool includes a sending resource pool and/or a receiving resource pool, and S102 is specifically: sending, by the UE, the D2D service by using the sending resource pool included in the at least one first resource pool, and receiving the D2D service by using the receiving resource pool included in the at least one first resource pool.

According to the resource configuration method provided in this embodiment, a resource pool is configured for a UE by using a broadcast message of a control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to the control node, which not only can reduce power consumption of the UE but also can reduce load on a to-be-connected base station.

Further, sending of a D2D service by the UE generally needs to be controlled by the control node, and therefore, the UE sending the D2D service needs to be connected to the control node. The UE connected to the control node may receive a UE-specific message, for example, RRC signaling, PDCCH signaling, and ePDCCH signaling. After the UE in the idle state (for example, RRC-idle) is connected to the control node and enter a connected state (for example, RRC-connected), the control node may further configure at least one resource pool for the UE by using a UE-specific message. In this case, the method in this embodiment further includes:

S103: The UE receives a dedicated message sent by the control node and including at least one second sub-resource pool.

S104: The UE receives a D2D service or sends a D2D service by using a resource in the at least one first resource pool or the at least one second sub-resource pool.

The second resource pool also includes a sending resource pool and/or a receiving resource pool, and S104 is specifically: sending, by the UE, the D2D service by using the sending resource pool included in the at least one first resource pool or the at least one second sub-resource pool, and receiving, by the UE, the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following.

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist:

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in the different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

FIG. 6 is a flowchart of Embodiment 2 of a resource configuration method according to embodiments. An example in which this embodiment is executed by a control node is used for description. As shown in FIG. 6, the method in this embodiment may include:

S201: A control node sends a broadcast message including at least one first resource pool, so that a UE that receives the broadcast message receives a D2D service or sends a D2D service by using a resource in the at least one first resource pool, where the control node is a base station serving the UE or a group head UE of a group to which the UE belongs.

Specifically, the control node configures, by using a broadcast message, at least one first resource pool for a UE served by the control node or a potential UE that is not yet connected to a system. The first resource pool includes a sending resource pool and/or a receiving resource pool, so that the UE sends a D2D service by using the sending resource pool included in the at least one first resource pool and receives a D2D service by using the receiving resource pool included in the at least one first resource pool.

According to the resource configuration method provided in this embodiment, a resource pool is configured for a UE by using a broadcast message of a control node, and the UE receives a D2D service or sends a D2D service by using a resource in the resource pool, which can resolve a problem of configuration of a resource pool for a UE in an idle state (RRC-idle). In this way, the UE in the idle state can acquire a sending resource pool or a receiving resource pool without connecting to the control node, which not only can reduce power consumption of the UE but also can reduce load on a to-be-connected base station.

Further, a behavior of sending a D2D service by the UE generally needs to be controlled by the control node, and therefore, the UE sending the D2D service needs to be connected to the control node. The UE connected to the control node may receive a UE-specific message, for example, RRC signaling, PDCCH signaling, and ePDCCH signaling. After the UE in the idle state is connected to the control node and enter a connected state, the control node may further configure at least one resource pool for the UE by using a UE-specific message. In this case, the method in this embodiment further includes the following.

S202: The control node sends a dedicated message including at least one second sub-resource pool to the UE, so that the UE receives a D2D service or sends a D2D service by using a resource in the at least one first resource pool or the at least one second sub-resource pool.

The second resource pool includes a sending resource pool and/or a receiving resource pool, so that the UE sends the D2D service by using the sending resource pool included in the at least one first resource pool or the at least one second sub-resource pool and receives the D2D service by using the receiving resource pool included in the at least one first resource pool or the at least one second sub-resource pool.

A UE that sends a D2D service can be scheduled and controlled more accurately and flexibly by using a UE-specific message to configure a sending resource pool.

In the foregoing embodiment, further, a method used by the UE to send the D2D service by using a resource in a sending resource pool or used by the UE to receive the D2D service by using a resource in a receiving resource pool may include at least one of the following:

1. The UE uses all resources in a sending resource pool or a receiving resource pool.

2. The control node allocates a resource in a sending resource pool or a receiving resource pool to the UE by using dedicated signaling.

3. The UE contends to use a resource in a sending resource pool or a receiving resource pool. Further, if the UE cannot obtain by means of contention a resource in a sending resource pool or a receiving resource pool for a long time, another resource pool is allocated to the UE. Specifically, after the UE obtains a sending resource pool or a receiving resource pool, if the UE cannot obtain by means of contention a resource in the obtained sending resource pool or receiving resource pool within time T, the UE sends a contention failure indication message or sends a resource pool reallocation request to the control node, and the control node performs rescheduling to allocate another resource pool to the UE. Specifically, the reallocated resource pool is different from a former resource pool. The foregoing time T is pre-configured or pre-defined, or is configured by the control node.

In the foregoing embodiment, the sending resource pool includes a sending resource pool of at least one cell or at least one proximity service group, and the receiving resource pool includes a receiving resource pool of at least one cell or at least one proximity service group. Configuring a sending resource pool of at least one cell or at least one ProSe group can enable a D2D service sent by the UE to be received by a UE in another cell or ProSe group, and configuring a receiving resource pool of at least one cell or at least one ProSe group can enable the UE to receive a D2D service sent by a UE in another cell or ProSe group.

Further, control nodes of different cells or different proximity service groups need to exchange sending resource pools and/or receiving resource pools with each other, so that the control nodes of different cells or different ProSe groups determine at least one sending resource pool and/or at least one receiving resource pool that needs to be sent, thereby implementing coordination of resource pools among different cells or different ProSe groups.

Further, a receiving resource pool and a sending resource pool of a same cell or a same proximity service group have an intersection set, so that UEs in a same cell or ProSe group can send a D2D service to or receive a D2D service from each other.

For a relationship between a quantity of resources included in a receiving resource pool and a quantity of resources included in a sending resource pool, where the receiving resource pool and the sending resource pool are allocated to a same UE, the following two cases exist.

1. The quantity of resources included in the receiving resource pool is greater than or equal to the quantity of resources included in the sending resource pool, where the receiving resource pool and the sending resource pool are allocated to the same UE.

For example, there are three different ProSe groups, and each group includes several service-sending UEs and service-receiving UEs. The three ProSe groups have an overlap area, and there are several service-receiving UEs and service-sending UEs in the overlap area. A control node allocates different sending resource pools to the service-sending UEs in the different ProSe groups, thereby avoiding mutual interference among D2D services sent by the service-sending UEs in the different groups. If there are several service-receiving UEs in the overlap area, these UEs may need to receive D2D services sent by service-sending UEs in multiple ProSe groups. Therefore, a quantity of receiving resource pools configured for these service-receiving UEs needs to be greater than a quantity of sending resource pools of the service-sending UEs.

2. The quantity of resources included in the receiving resource pool is less than or equal to the quantity of resources included in the sending resource pool, where the receiving resource pool and the sending resource pool are allocated to the same UE.

For example, the control node allocates different receiving resource pools to the service-receiving UEs in different ProSe groups. If there are several service-sending UEs in the overlap area, these UEs may need to send D2D services to service-receiving UEs in multiple ProSe groups, and therefore, a quantity of sending resource pools that need to be configured for these service-sending UEs needs to be greater than a quantity of receiving resource pools of the service-receiving UEs. In this case, fewer receiving resource pools are configured for the service-receiving UEs, thereby reducing receiving complexity of the service-receiving UEs.

The following describes the technical solutions in the foregoing method embodiments in detail by using a specific embodiment.

FIG. 7 is a flowchart of Embodiment 3 of a resource configuration method according to embodiments. As shown in FIG. 7, the method in this embodiment may include the following.

S301: A control node sends a broadcast message including at least one first resource pool, where the control node is a base station serving a UE or a group head UE of a group to which a UE belongs.

The first resource pool includes a sending resource pool and/or a receiving resource pool. The UE sends a D2D service by using the sending resource pool included in the at least one first resource pool and receives a D2D service by using the receiving resource pool included in the at least one first resource pool.

S302: The UE receives the broadcast message sent by the control node and including the at least one first resource pool.

S303: The UE receives a D2D service or sends a D2D service by using a resource in the at least one first resource pool.

Further, sending of a D2D service by the UE generally needs to be controlled by the control node, and therefore, the UE sending the D2D service needs to be connected to the control node. The UE connected to the control node may receive a UE-specific message, for example, RRC signaling, PDCCH signaling, and ePDCCH signaling. After a UE in an idle state is connected to the control node and enter a connected state, the control node may further configure at least one resource pool for the UE by using a UE-specific message. In this case, the method in this embodiment further includes the following.

S304: The control node sends a dedicated message including at least one second sub-resource pool to the UE.

S305: The UE receives the dedicated message sent by the control node and including the at least one second sub-resource pool.

S306: The UE receives a D2D service or sends a D2D service by using a resource in the at least one first resource pool or the at least one second sub-resource pool.

The second resource pool also includes a sending resource pool and/or a receiving resource pool. The UE sends the D2D service by using the sending resource pool included in the at least one first resource pool or the at least one second sub-resource pool, and the UE receives the D2D service by using the receiving resource pool included in the at least one first resource pool or the at least one second sub-resource pool.

In the several embodiments provided in embodiments, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of embodiments, but not for limiting the embodiments.

Although the embodiments are described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments.

What is claimed is:

1. A user equipment (UE), comprising:
   a receiver, configured to receive a broadcast message sent out by a control node, while the UE is in an idle state, and to receive, from the control node, a dedicated message that is specific to the UE, and that is sent by the control node after the UE becomes connected to the control node and enters a connected state, wherein the broadcast message comprises a first resource pool, wherein the dedicated message comprises a second sub-resource pool, wherein the first resource pool or the second sub-resource pool comprises a sending resource pool or a receiving resource pool, and wherein the control node is a base station serving either the UE, or a group head UE of a group, and the UE belongs to the group;
   a processor; and
   a non-transitory computer readable storage medium storing a program for execution by the processor, the program including instructions to contend to obtain a resource in the sending resource pool or the receiving resource pool, to use the resource that is obtained for communicating device to device (D2D) with a second UE, and to determine when the UE fails to obtain within a period of time, by means of contention, the resource; and
   a transmitter, configured to send a failure indication message or a resource pool reallocation request to the control node in response to a determination that the UE failed, within the period of time, to obtain the resource in the sending resource pool or the receiving resource pool;
   wherein the instructions to use the resource that is obtained comprise instructions to:
      send D2D to the second UE using the resource that is obtained, when the resource is in the sending resource pool; and
      receive D2D from the second UE using the resource that is obtained, when the resource is in the receiving resource pool.

2. The UE according to claim 1, wherein the sending resource pool comprises a cell or a proximity service group, and wherein the receiving resource pool comprises the cell or the proximity service group.

3. The UE according to the claim 1, wherein the receiver is further configured to receive an additional dedicated message sent by the control node, wherein the additional dedicated message comprises a reallocation of resources of a third resource pool that is different from an allocation of resources of the first resource pool or the second sub-resource pool, wherein the control node transmits the additional dedicated message to the UE in response to receiving the failure indication message or the resource pool reallocation request from the UE.

4. The UE according to claim 1, wherein the dedicated message comprises radio resource control (RRC) signaling, physical downlink control channel (PDCCH) signaling, or enhanced physical downlink control channel (ePDCCH) signaling.

5. The UE of claim 1, wherein the sending resource pool or the receiving resource pool is received by the control node in an exchange of resources with another control node.

6. A control node, comprising:
   a transmitter, configured to:
      send out a broadcast message that is received by a user equipment (UE) that is in an idle state; and
      send a dedicated message to the UE, after the UE becomes connected to the control node and enters a connected state; and
   a receiver;
   wherein the broadcast message comprises an allocation of resources of a first resource pool, wherein the dedicated message is specific to the UE, and the dedicated message comprises another allocation of resources of a second sub-resource pool, wherein the first resource pool or the second sub-resource pool comprises a sending resource pool or a receiving resource pool;
   wherein the UE can contend to obtain a resource in the sending resource pool or the receiving resource pool, determine when there is a failure to obtain within a period of time, by means of contention, the resource, and use the resource that is obtained to communicate device to device (D2D) with a second UE by sending D2D to the second UE when the resource that is obtained is in the sending resource pool and by receiving D2D from the second UE when the resource that is obtained is in the receiving resource pool;
   wherein the control node is a base station serving either the UE, or a group head UE of a group and the UE belongs to the group;
   wherein the receiver is configured to receive a message from the UE, wherein the message comprises a failure indication message or a resource pool reallocation request, wherein the message comprises an indication that the UE could not obtain by means of contention the resource in the sending resource pool or the receiving resource pool;
   wherein the control node allocates a third sub-resource pool that is different from the allocation of resources of the first resource pool or the second sub-resource pool, in response to the receiver receiving the message from the UE; and
   wherein the transmitter sends an additional dedicated message to the UE, wherein the additional dedicated message comprises the allocation of resources of the third sub-resource pool.

7. The control node according to claim 6, wherein the sending resource pool comprises a cell or a proximity service group, and wherein the receiving resource pool comprises the cell or the proximity service group.

8. The control node according to claim 7, wherein the control node further comprises:
   a receiver, configured to receive information from another control node of a different cell or different proximity service group, wherein the information comprises a different allocation of resources by the other control node;
   a processor; and
   a non-transitory computer readable storage medium storing a program for execution by the processor, the program including instructions to determine the allocation of resources of the first resource pool or the second sub-resource pool in accordance with the information received from the other control node about the different allocation of resources by the other control node.

9. The control node according to claim 6, wherein the transmitter is further configured to send an additional dedicated message to the UE, wherein the additional dedicated message comprises an allocation of resources of a third sub-resource pool that is different from the allocation of resources of the first resource pool or the second sub-resource pool, in response to the receiver receiving the message from the UE.

10. The control node according to claim 6, wherein the dedicated message comprises radio resource control (RRC) signaling, physical downlink control channel (PDCCH) signaling, or enhanced physical downlink control channel (ePDCCH) signaling.

11. The control node of claim 6, wherein the sending resource pool or the receiving resource pool is received by the control node in an exchange of resources with another control node.

12. A method, comprising:
receiving, by a user equipment (UE) a broadcast message sent out by a control node, while the UE is in an idle state, wherein the broadcast message comprises a first resource pool, wherein the control node is a base station serving either the UE, or a group head UE of a group and the UE belongs to the group;
connecting, by the UE, to the control node;
receiving, by the UE from the control node, a dedicated message specific to the UE, after the UE becomes connected to the control node and enters a connected state, wherein the dedicated message comprises a second sub-resource pool, wherein the first resource pool or the second sub-resource pool comprises a sending resource pool or a receiving resource pool;
contending, by the UE, to obtain a resource from the sending resource pool or the receiving resource pool;
determining, by the UE, when there is a failure to obtain within a period of time, the resource;
sending, by the UE, a failure indication or a resource pool allocation request to the control node in response to a determination that the UE failed, within the period of time, to obtain the resource; and
using, by the UE, the resource that is obtained for communicating, by the UE, device to device (D2D) with a second UE by sending D2D to the second UE when the resource that is obtained is in the sending resource pool, and by receiving D2D from the second UE when the resource that is obtained is in the receiving resource pool.

13. The method according to claim 12, wherein the sending resource pool comprises a cell or a proximity service group, and wherein the receiving resource pool comprises the receiving resource pool comprising the cell or the proximity service group.

14. The method according to claim 12, wherein the dedicated message comprises radio resource control (RRC) signaling, physical downlink control channel (PDCCH) signaling, or enhanced physical downlink control channel (ePDCCH) signaling.

15. The method of claim 12, wherein the sending resource pool or the receiving resource pool is received by the control node in an exchange of resources with another control node, and wherein the control node belongs to a different ProSe group than the other control node.

16. A method, comprising:
sending out, by a control node, a broadcast message that is received by a user equipment (UE) that is in an idle state; and sending to the UE, by the control node, a dedicated message that is specific to the UE, after the UE becomes connected to the control node and enters a connected state;
wherein the broadcast message comprises an allocation of resources of a first resource pool, and the dedicated message comprises another allocation of resources of a second sub-resource pool, wherein the first resource pool or the second sub-resource pool comprises a sending resource pool or a receiving resource pool;
wherein the UE can contend to obtain a resource in the sending resource pool or the resource pool, can determine when there is a failure to obtain within the resource within a period of time, and can use the resource that is obtained to communicate device to device (D2D) with a second UE, by sending D2D to the second UE when the resource that is obtained is in the sending resource pool, and receiving D2D from the second UE when the resource that is obtained is in the receiving resource pool;
wherein the control node is a base station serving either the UE, or a group head UE of a group and the UE belongs to the group; and
wherein the method further comprises:
receiving from the UE a message comprising a failure indication message or a resource pool reallocation request, wherein the message comprises an indication that the UE could not obtain the resource in the sending resource pool or the receiving resource pool; and
allocating a third sub-resource pool that is different from the allocation of resources of the first resource pool or the second sub-resource pool, in response to the receiver receiving the message from the UE; and
sending an additional dedicated message to the UE, wherein the additional dedicated message comprises the allocation of resources of the third sub-resource pool.

17. The method according to claim 16, wherein the sending resource pool comprises a sending resource pool comprising a cell or a proximity service group, and wherein the receiving resource pool comprises a receiving resource pool comprising the cell or the proximity service group.

18. The method according to claim 16, wherein the dedicated message comprises radio resource control (RRC) signaling, physical downlink control channel (PDCCH) signaling, or enhanced physical downlink control channel (ePDCCH) signaling.

19. The method of claim 16, further comprising receiving the sending resource pool or the receiving resource pool in an exchange of resources with another control node.

20. The method of claim 19, wherein the control node belongs to a different ProSe group than the other control node.

* * * * *